(12) United States Patent
Lei et al.

(10) Patent No.: US 11,871,223 B2
(45) Date of Patent: Jan. 9, 2024

(54) AUTHENTICATION METHOD AND APPARATUS AND DEVICE

(71) Applicant: Huawei Technologies Co., Ltd., Shenzhen (CN)

(72) Inventors: Zhongding Lei, Singapore (SG); Xin Kang, Singapore (SG); Haiguang Wang, Singapore (SG)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 17/498,175

(22) Filed: Oct. 11, 2021

(65) Prior Publication Data

US 2022/0030429 A1 Jan. 27, 2022

Related U.S. Application Data

(63) Continuation of application No. PCT/CN2020/077791, filed on Mar. 4, 2020.

(30) Foreign Application Priority Data

Apr. 12, 2019 (CN) .......................... 201910292439.9

(51) Int. Cl.
*H04W 12/06* (2021.01)
*H04W 12/03* (2021.01)
(Continued)

(52) U.S. Cl.
CPC ............. *H04W 12/06* (2013.01); *H04W 4/12* (2013.01); *H04W 12/03* (2021.01); *H04W 60/04* (2013.01)

(58) Field of Classification Search
CPC ....................................................... H04W 12/06
(Continued)

(56) References Cited

U.S. PATENT DOCUMENTS 10,848,970 B2 11/2020 Lei et al.
11,025,619 B2 6/2021 Sun
(Continued)

FOREIGN PATENT DOCUMENTS

CN 104618891 A 5/2015
CN 104899497 A 9/2015
(Continued)

OTHER PUBLICATIONS

"3rd Generation Partnership Project; Technical Specification Group Services and System Aspects; Study on user centric identifiers and authentication (Release 16)," 3GPP TR 22.904 V16.1.0, Sep. 2018, 20 pages.
(Continued)

*Primary Examiner* — Kiet M Doan

(74) *Attorney, Agent, or Firm* — Slater Matsil, LLP

(57) ABSTRACT

An authentication method, apparatus, and device. The method includes sending, by a core network device, an authentication request message of a user to a data network device, where the authentication request message requests that the data network device perform identity authentication on the user, and receiving, by the core network device, an authentication response message sent by the data network
(Continued)

device, where the authentication response message comprises first information, and the first information indicates user identity information of the user.

14 Claims, 9 Drawing Sheets

(51) Int. Cl.
*H04W 4/12* (2009.01)
*H04W 60/04* (2009.01)

(58) Field of Classification Search
USPC .......................... 455/411; 370/331, 338, 329
See application file for complete search history.

(56) References Cited

U.S. PATENT DOCUMENTS

| | | | |
|---|---|---|---|
| 2014/0349611 A1 | 11/2014 | Kant et al. | |
| 2015/0304847 A1* | 10/2015 | Gong | H04L 63/0823 455/411 |
| 2018/0098340 A1* | 4/2018 | Sashihara | H04W 72/23 |
| 2018/0317086 A1 | 11/2018 | Ben Henda et al. | |
| 2019/0110238 A1 | 4/2019 | Buckley | |
| 2021/0136589 A1* | 5/2021 | Kawasaki | H04W 12/06 |

FOREIGN PATENT DOCUMENTS

| | | |
|---|---|---|
| CN | 107026823 A | 8/2017 |
| CN | 107294721 A | 10/2017 |
| CN | 108513289 A | 9/2018 |
| WO | 2018077232 A1 | 5/2018 |
| WO | 2018208949 A1 | 11/2018 |
| WO | 2020146076 A1 | 7/2020 |

OTHER PUBLICATIONS

"Update of Solution #2.14 with EAP-PSK Authentication Method," Source: Huawei, Hisilicon, Document for: Approval, Agenda Item: 8.4.2, 3GPP TSG SA WG3 (Security) Meeting #86, S3-170436, Feb. 6-10, 2017, Sophia Antipolis (France) revision of S3-170065, 6 pages.

"3rd Generation Partnership Project; Technical Specification Group Services and System Aspects; Security Aspects; Study on Security Aspects of Enhanced Network Slicing (Release 16)," 3GPP TR 33.813 V0.3.0, Mar. 2019, 22 pages.

\* cited by examiner

AUTHENTICATION METHOD AND APPARATUS AND DEVICE

CROSS-REFERENCE TO RELATED APPLICATIONS

This application is a continuation of International Application No. PCT/CN2020/077791, filed on Mar. 4, 2020, which claims priority to Chinese Patent Application No. 201910292439.9, filed on Apr. 12, 2019. The disclosures of the aforementioned applications are hereby incorporated by reference in their entireties.

TECHNICAL FIELD

This application relates to the field of communications technologies, and in particular, to an authentication method and apparatus and a device.

BACKGROUND

A network slice is a virtual private network. Before a terminal device accesses the network slice, a data network device needs to authenticate an identity of a user using the terminal device. The data network device may be a third-party network device. For example, the third-party network device may be a game platform.

In a conventional technology, the terminal device may request, through a core network device (a device of an operator network), the third-party network device to authenticate the identity of the user. For example, the terminal device may send user identity information of the user to the core network device, and the core network device requests, based on the user identity information, the data network device to authenticate the identity of the user. However, the user identity information is private data of the user. In the foregoing process, the user identity information may be leaked, resulting in relatively low user privacy security.

SUMMARY

This application provides an authentication method and apparatus and a device, to improve user privacy security.

According to a first aspect, an embodiment of this application provides an authentication method. A core network device sends an authentication request message of a user to a data network device, where the authentication request message is used to request the data network device to perform identity authentication on the user. The core network device receives an authentication response message sent by the data network device, where the authentication response message includes first information, and the first information is used to indicate user identity information of the user.

In the foregoing process, a data network user identity (DUI) of the user is invisible to other devices (the core network device and an access network device, or an access network device), so that the DUI is not leaked to these devices, and the DUI is not leaked in a transmission process (for example, transmission between a terminal device and the access network device, transmission between the access network device and the core network device, or transmission between the core network device and the data network device), thereby improving user privacy security.

In a possible implementation, the authentication request message includes the first information.

In the foregoing process, the data network device may determine a to-be-authenticated user based on the first information in the authentication request message, and then perform identity authentication on the to-be-authenticated user. The authentication request message includes less content, thereby reducing signaling overheads.

In a possible implementation, the authentication request message further includes the user identity information, the user identity information is located in a container of the authentication request message, and the first information is located outside the container of the authentication request message.

In the foregoing process, after receiving the authentication request message, the data network device may obtain the user identity information from the container, and obtain first information corresponding to the user identity information, and determine whether the first information corresponding to the user identity information is the same as the first information included in the authentication request message. When the data network device determines that the first information corresponding to the user identity information is the same as the first information included in the authentication request message, the data network device performs identity authentication on the user indicated by the user identity information. In this way, a problem that user identity authentication is incorrect when information in the authentication request message is maliciously tampered with in a data transmission process is avoided, thereby improving authentication security.

In a possible implementation, before sending the authentication request message to the data network device, the core network device receives a registration request message sent by the terminal device, where the registration request message includes the first information and the user identity information, the user identity information is located in a container of the registration request message, and the first information is located outside the container of the registration request message.

In the foregoing process, the core network device may obtain the first information and the user identity information by using the registration request message, and does not need to obtain the first information and the user identity information by using additional signaling, thereby reducing signaling overheads.

In a possible implementation, before sending the authentication request message to the data network device, the core network device sends a user identity request message to the terminal device, and receive a user identity response message sent by the terminal device, where the user identity response message includes the first information and the user identity information.

In the foregoing process, the core network device may obtain the first information and the user identity information by using the registration request message, and does not need to obtain the first information and the user identity information by using additional signaling, thereby reducing signaling overheads.

In a possible implementation, the core network device obtains an identifier of the terminal device, and stores a correspondence between the identifier of the terminal device and the first information. In this way, the core network device may determine a correspondence between a user and a terminal device. Correspondingly, after receiving the authentication response message, the core network device may determine a corresponding terminal device based on the user indicated by the first information in the authentication response message, and performs a corresponding processing operation on the terminal device (for example, sends a registration response message).

In a possible implementation, the identifier of the terminal device includes a subscription permanent identifier (SUPI) and/or a subscription concealed identifier (SUCI).

In a possible implementation, that a core network device sends an authentication request message of a user to a data network device includes the core network device obtains the first information. The core network device determines address information of the data network device based on the first information. The core network device sends the authentication request message to the data network device based on the address information.

In the foregoing process, the core network device may obtain the address information of the data network device based on the first information, so that the core network device can quickly obtain the address information of the data network device.

In a possible implementation, slice information is network slice selection assistance information (NSSAI).

In a possible implementation, the core network device receives a first status update request message sent by the data network device, where the first status update request message includes the first information.

The core network device updates, based on the first status update request message, a status of the user corresponding to the first information.

The core network device sends a first status update response message to the data network device, where the first status update response message includes the first information.

In the foregoing process, after updating the status of the user, the data network device sends the first status update request message to the core network device, and includes the first information in the first status update request message. In this way, the core network device can identify the corresponding user based on the first information, and update the status of the identified user. In the foregoing process, in a process in which the data network device communicates with the core network device, the DUI of the user is invisible to the core network device, thereby avoiding leakage of the DUI, and ensuring user privacy.

In a possible implementation, the core network device sends a second status update request message to the data network device, where the second status update request message includes the first information. The core network device receives a second status update response message sent by the data network device, where the second status update response message includes the first information.

In the foregoing process, the core network device may request the data network device to perform an update operation on a status of the user, and information exchanged between the data network device and the core network device includes the first information. In this way, the core network device can identify the corresponding user based on the first information, so that the data network device implements the update operation on the status of the user. In the foregoing process, in a process in which the data network device communicates with the core network device, the DUI of the user is invisible to another device in transmission between the core network device, the terminal device and the data network device, thereby avoiding leakage of the DUI, and ensuring user privacy.

In a possible implementation, the core network device sends a notification message to the terminal device, where the notification message includes the first information, and is used to indicate that the status of the user corresponding to the first information is updated.

According to a second aspect, an embodiment of this application provides an authentication method. A data network device receives an authentication request message of a user sent by a core network device. The data network device performs identity authentication on the user based on the authentication request message, and sends an authentication response message to the core network device, where the authentication response message includes first information, and the first information is used to indicate user identity information of the user.

In the foregoing process, a DUI of the user is invisible to other devices (the core network device and an access network device, or an access network device), so that the DUI is not leaked to these devices, and the DUI is not leaked in a transmission process (for example, transmission between a terminal device and the access network device, transmission between the access network device and the core network device, or transmission between the core network device and the data network device), thereby improving user privacy security.

In a possible implementation, the authentication request message includes the first information.

In the foregoing process, the data network device may determine a to-be-authenticated user based on the first information in the authentication request message, and then perform identity authentication on the to-be-authenticated user. The authentication request message includes less content, thereby reducing signaling overheads.

In a possible implementation, the authentication request message further includes the user identity information, the user identity information is located in a container of the authentication request message, and the first information is located outside the container of the authentication request message.

In the foregoing process, after receiving the authentication request message, the data network device may obtain the user identity information from the container, and obtain first information corresponding to the user identity information, and determine whether the first information corresponding to the user identity information is the same as the first information included in the authentication request message. When the data network device determines that the first information corresponding to the user identity information is the same as the first information included in the authentication request message, the data network device performs identity authentication on the user indicated by the user identity information. In this way, a problem that user identity authentication is incorrect when information in the authentication request message is maliciously tampered with in a data transmission process is avoided, thereby improving authentication security.

In a possible implementation, the authentication request message includes the first information. The data network device may determine the user identity information based on the first information. The data network device performs identity authentication on the user based on the user identity information.

In a possible implementation, the authentication request message includes the first information. The data network device may perform identity authentication on the user based on the first information.

In a possible implementation, the authentication request message includes the user identity information. Before sending the authentication response message to the core network device, the data network device determines the first information based on the user identity information.

In a possible implementation, the data network device sends a first status update request message to the core network device, where the first status update request message includes the first information, and the first status update request message is used to request the core network device to update the status of the user indicated by the first information. The data network device receives a first status update response message sent by the core network device, where the first status update response message includes the first information.

In the foregoing process, after updating the status of the user, the data network device sends the first status update request message to the core network device, and includes the first information in the first status update request message. In this way, the core network device can identify the corresponding user based on the first information, and update the status of the identified user. In the foregoing process, in a process in which the data network device communicates with the core network device, the DUI of the user is invisible to the core network device, thereby avoiding leakage of the DUI, and ensuring user privacy.

In a possible implementation, the data network device receives a second status update request message sent by the core network device, where the second status update request message includes the first information. The data network device determines the user identity information based on the first information, and updates the status of the user based on the user identity information. The data network device sends a second status update response message to the core network device, where the second status update response message includes the first information.

In the foregoing process, the core network device may request the data network device to perform an update operation on the status of the user, and information exchanged between the data network device and the core network device includes the first information. In this way, the core network device can identify the corresponding user based on the first information, so that the data network device implements the update operation on the status of the user. In the foregoing process, in a process in which the data network device communicates with the core network device, the DUI of the user is invisible to another device in transmission between the core network device, the terminal device and the data network device, thereby avoiding leakage of the DUI, and ensuring user privacy.

According to a third aspect, an embodiment of this application provides an authentication apparatus. The apparatus includes a sending module and a receiving module.

The sending module is configured to send an authentication request message of a user to a data network device, where the authentication request message is used to request the data network device to perform identity authentication on the user.

The receiving module is configured to receive an authentication response message sent by the data network device, where the authentication response message includes first information, and the first information is used to indicate user identity information of the user.

In a possible implementation, the authentication request message includes the first information.

In a possible implementation, the authentication request message further includes the user identity information, the user identity information is located in a container of the authentication request message, and the first information is located outside the container of the authentication request message.

In a possible implementation, the receiving module is further configured to before the sending module sends the authentication request message to the data network device, receive a registration request message sent by a terminal device, where the registration request message includes the first information and the user identity information, the user identity information is located in a container of the registration request message, and the first information is located outside the container of the registration request message.

In a possible implementation, the sending module is further configured to before the sending module sends the authentication request message to the data network device, send a user identity request message to a terminal device.

The receiving module is further configured to receive a user identity response message sent by the terminal device, where the user identity response message includes the first information and the user identity information.

In a possible implementation, the apparatus further includes a processing module. The processing module is configured to obtain an identifier of the terminal device, and store a correspondence between the identifier of the terminal device and the first information.

In a possible implementation, the identifier of the terminal device includes a subscription permanent identifier (SUPI) and/or a subscription concealed identifier (SUCI).

In a possible implementation, the processing module is further configured to obtain the first information, and determine address information of the data network device based on the first information.

The sending module is specifically configured to send the authentication request message to the data network device based on the address information.

In a possible implementation, slice information is network slice selection assistance information (NSSAI).

In a possible implementation, the receiving module is further configured to receive a first status update request message sent by the data network device, where the first status update request message includes the first information.

The processing module is further configured to update, based on the first status update request message, a status of the user corresponding to the first information.

The sending module is further configured to send a first status update response message to the data network device, where the first status update response message includes the first information.

In a possible implementation, the sending module is further configured to send a second status update request message to the data network device, where the second status update request message includes the first information.

The receiving module is further configured to receive a second status update response message sent by the data network device, where the second status update response message includes the first information.

In a possible implementation, the sending module is further configured to send a notification message to the terminal device, where the notification message includes the first information, and is used to indicate that the status of the user corresponding to the first information is updated.

According to a fourth aspect, an embodiment of this application provides an authentication apparatus. The apparatus includes a receiving module, a processing module, and a sending module.

The receiving module is configured to receive an authentication request message of a user sent by a core network device.

The processing module is configured to perform identity authentication on the user based on the authentication request message.

The sending module is configured to send an authentication response message to the core network device, where the authentication response message includes first information, and the first information is used to indicate user identity information of the user.

In a possible implementation, the authentication request message includes the first information.

In another possible implementation, the authentication request message further includes the user identity information, the user identity information is located in a container of the authentication request message, and the first information is located outside the container of the authentication request message.

In a possible implementation, the authentication request message includes the first information. The processing module is specifically configured to determine the user identity information based on the first information, and perform identity authentication on the user based on the user identity information.

In a possible implementation, the authentication request message includes the first information. The processing module is specifically configured to perform identity authentication on the user based on the first information.

In a possible implementation, the authentication request message includes the user identity information. The processing module is further configured to before the sending module sends the authentication response message to the core network device, determine the first information based on the user identity information.

In a possible implementation, the sending module is further configured to send a first status update request message to the core network device, where the first status update request message includes the first information, and the first status update request message is used to request the core network device to update a status of the user indicated by the first information.

The receiving module is further configured to receive a first status update response message sent by the core network device, where the first status update response message includes the first information.

In a possible implementation, the receiving module is further configured to receive a second status update request message sent by the core network device, where the second status update request message includes the first information.

The processing module is further configured to determine the user identity information based on the first information, and update the status of the user based on the user identity information.

The sending module is further configured to send a second status update response message to the core network device, where the second status update response message includes the first information.

According to a fifth aspect, an embodiment of this application provides an authentication apparatus. The apparatus includes a memory and a processor. The processor executes program instructions in the memory, to implement the authentication method according to any one of the first aspect or the possible implementations of the first aspect.

According to a sixth aspect, an embodiment of this application provides an authentication apparatus. The apparatus includes a memory and a processor. The processor executes program instructions in the memory, to implement the authentication method according to any one of the second aspect or the possible implementations of the second aspect.

According to a seventh aspect, an embodiment of this application provides a storage medium. The storage medium is configured to store a computer program. When executed by a computer or a processor, the computer program is used to implement the authentication method according to any one of the first aspect or the possible implementations of the first aspect.

According to an eighth aspect, an embodiment of this application provides a storage medium. The storage medium is configured to store a computer program. When executed by a computer or a processor, the computer program is used to implement the authentication method according to any one of the second aspect or the possible implementations of the second aspect.

According to the authentication method and apparatus and the device provided in the embodiments of this application, when identity authentication (secondary authentication) needs to be performed on the user, the core network device sends the authentication request message of the user to the data network device, and the data network device may perform identity authentication on the user, and send the authentication response message to the core network device. The authentication response message includes the first information, and the first information may indicate the DUI of the user. In this way, the core network device may determine, based on the authentication response message, a result of identity authentication performed on the user. In the foregoing process, the DUI of the user is invisible to other devices (the core network device and the access network device, or the access network device), so that the DUI is not leaked to these devices, and the DUI is not leaked in the transmission process (for example, transmission between the terminal device and the access network device, transmission between the access network device and the core network device, or transmission between the core network device and the data network device), thereby improving user privacy security.

DETAILED DESCRIPTION OF ILLUSTRATIVE EMBODIMENTS

An operator network may also be referred to as a mobile communications network, and is mainly a network in which a mobile network operator (mobile network operator, MNO) provides a mobile broadband access service for a user. The operator network described in embodiments of this application may be specifically a network that meets a requirement of a 3rd generation partnership project (3GPP) standard, which is referred to as a 3GPP network. Usually, the 3GPP network is operated by an operator, and includes but is not limited to a 5G network, a $4^{th}$ generation (4G) network, a third-generation mobile communications technology (3rd-generation, 3G) network, a second-generation wireless telephone technology (2nd-generation, 2G) network, and the like. For ease of description, the operator network is used as an example below for description.

The expansion of mobile broadband access services has resulted in development of MNO networks, to better support diversified business models and meet requirements for more diversified application services and more industries. To provide better and more complete services for more industries, a network architecture of a next-generation network (namely, the 5G network) is adjusted compared with that of the 4G network. For example, the 5G network splits a mobility management entity (MME) in the 4G network into a plurality of network elements including an access and mobility management function (AMF), a session management function (session management function, SMF), and the like. In a 3GPP standardization process, a 5G network architecture based on a service-oriented architecture is further defined, as shown in FIG. 1A.

Figure 1A:
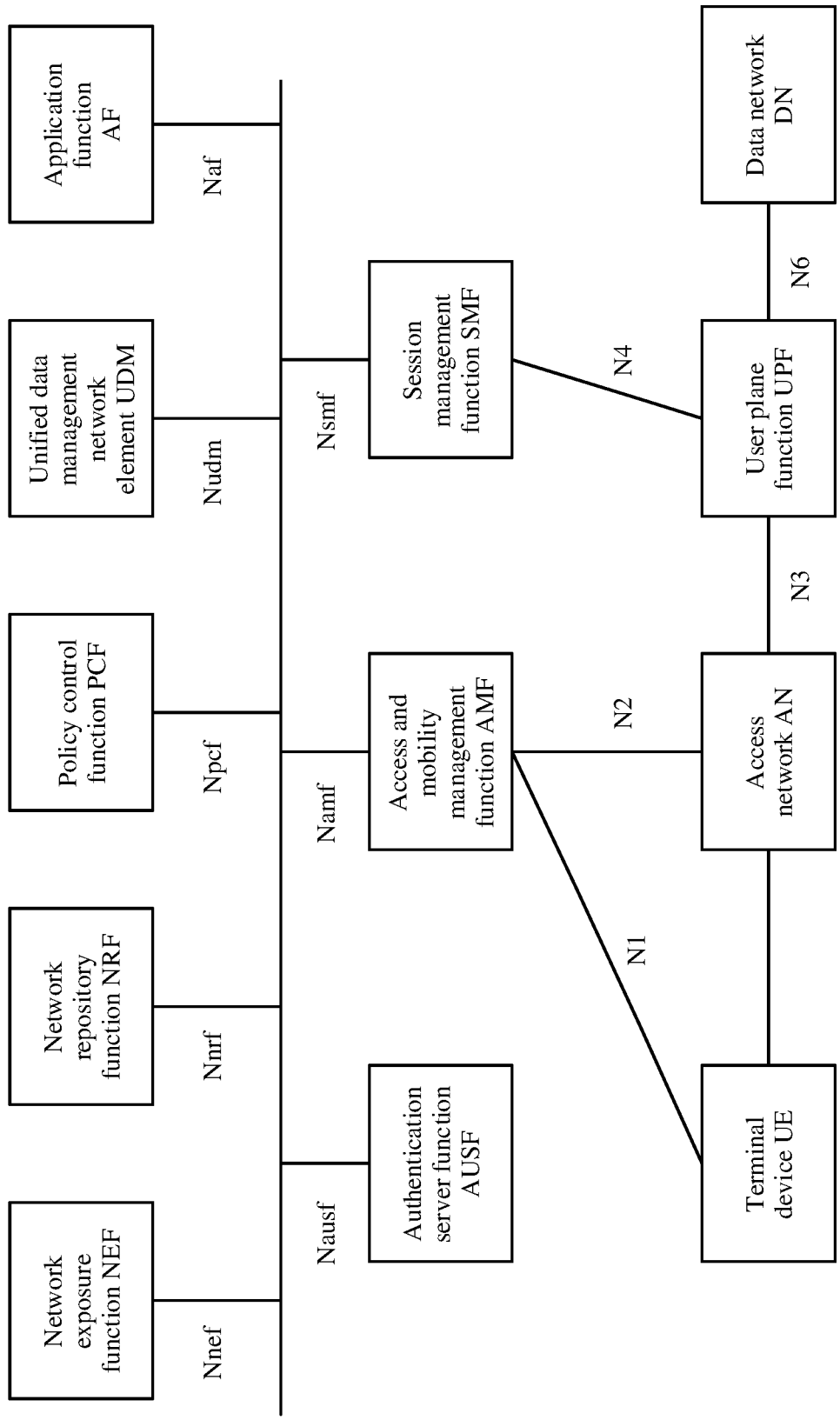
FIG. 1A is an architectural diagram of a $5^{th}$ generation (5G) network according to an embodiment of this application.

FIG. 1A is an architectural diagram of a 5G network according to an embodiment of this application. Refer to FIG. 1A. The 5G network architecture may include a terminal device, a data network (DN), and an operator network.

The operator network may include a network exposure function (NEF) network element, a network repository function (NRF) network element, a policy control function (PCF) network element, a unified data management (UDM) network element, an application function (AF) network element, an authentication server function (, AUSF) network element, an access and mobility management function (AMF) network element, a session management function (SMF) network element, a (radio) access network ((R)AN), a user plane function (UPF) network element, and the like. In the foregoing operator network, the parts other than the (radio) access network are referred to as core network parts. For ease of description, an example in which the (R)AN is referred to as a RAN is used below for description.

The terminal device (which may also be referred to as user equipment (user equipment, UE)) in this embodiment of this application is a device having a wireless transceiver function. The terminal device may be deployed on land, including an indoor device, an outdoor device, a hand-held device, or a vehicle-mounted device, or may be deployed on a water surface (for example, on a ship), or may be deployed in air (for example, in an aircraft, a balloon, or a satellite). The terminal device may be a mobile phone, a tablet computer, a computer having the wireless transceiver function, a virtual reality (VR) terminal, an augmented reality (AR) terminal, a wireless terminal in industrial control, a wireless terminal in self driving (self driving), a wireless terminal in telemedicine, a wireless terminal in a smart grid, a wireless terminal in transportation safety, a wireless terminal in a smart city, a wireless terminal in a smart home, or the like.

The terminal device may establish a connection to the operator network through an interface (for example, N1) provided by the operator network, and use a service such as data and/or voice provided by the operator network. The terminal device may further access the DN through the operator network, and use an operator service deployed on the DN and/or a service provided by a third party. The third party may be a service provider other than the operator network and the terminal device, and may provide a service such as data and/or voice for the terminal device. A specific representation form of the third party may be specifically determined based on an actual application scenario. This is not limited herein.

The RAN is a sub-network of the operator network, and is an implementation system between a service node in the operator network and the terminal device. To access the operator network, the terminal device passes through the RAN, and then may be connected to the service node in the operator network by using the RAN. A RAN device in this application is a device that provides a wireless communications function for the terminal device. The access network device includes but is not limited to a next-generation base station (next-generation NodeB, gNB) in 5G, an evolved NodeB (eNB), a radio network controller (RNC), a NodeB (NodeB, NB), a base station controller (BSC), a base transceiver station (BTS), a home base station (for example, a home evolved NodeB, or a home NodeB (HNB)), a baseband unit (BBU), a transmission reception point (TRP), a transmission point (TP), a mobile switching center, and the like.

The AMF network element is a control plane network element provided by the operator network, and is responsible for access control and mobility management for accessing the operator network by the terminal device, for example, including functions such as mobility status management, allocation of a temporary user identity, and user authentication and authorization.

The SMF network element is a control plane network element provided by the operator network, and is responsible for managing a protocol data unit (PDU) session of the terminal device. The PDU session is a channel used to transmit a PDU, and the terminal device needs to transmit a PDU to the DN through the PDU session. The SMF network element is responsible for establishment, maintenance, deletion, and the like of the PDU session. The SMF network element includes functions related to a session, for example, session management (for example, session establishment, modification, and release, including tunnel maintenance between the UPF and the AN), selection and control of the UPF network element, service and session continuity (SSC) mode selection, and roaming.

The UPF network element is a gateway provided by an operator, and is a gateway for communication between the operator network and the DN. The UPF network element includes functions related to a user plane, for example, data packet routing and transmission, packet detection, service usage reporting, quality of service (QoS) processing, lawful interception, uplink packet detection, and downlink data packet storage.

The DN may also be referred to as a packet data network (PDN), and is a network located outside the operator network. The operator network may access a plurality of DNs, and a plurality of services may be deployed on the DNs, to provide a service such as data and/or voice for the terminal device. For example, the DN is a private network of a smart factory, a sensor installed in a workshop of the smart factory may be a terminal device, a control server of the sensor is deployed on the DN, and the control server may provide a service to the sensor. The sensor may communicate with the control server, to obtain instructions of the control server, transmit collected sensor data to the control server according to the instructions, and so on. For another example, the DN is an internal office network of a company, a mobile phone or a computer of an employee of the company may be a terminal device, and the mobile phone or the computer of the employee may access information, data resources, and the like on the internal office network of the company.

The UDM network element is a control plane network element provided by the operator, and is responsible for storing information such as a subscription permanent identifier (SUPI), a credential, a security context, and subscription data of a subscriber in the operator network. The SUPI is first encrypted during transmission, and the encrypted SUPI is referred to as a subscription concealed identifier (SUCI). The information stored in the UDM network element may be used for authentication and authorization when the terminal device accesses the operator network. The subscriber in the operator network may be specifically a user using a service provided by the operator network, for example, a user using a SIM card of China Telecom or a user using a SIM card of China Mobile. The subscription permanent identifier (SUPI) of the subscriber may be a number of the SIM card or the like. The credential and the security context of the subscriber may be stored small files such as an encryption key of the SIM card or information related to encryption of the SIM card, and are used for authentication and/or authorization. The security context may be cookie, a token, or the like stored in a local terminal (for example, a mobile phone) of the user. The subscription data of the subscriber may be a supporting service of the SIM card, for example, a traffic package or a used network of the SIM card. It should be noted that the permanent identifier, the credential, the security context, the cookie, and the token are equivalent to information related to authentication and authorization, and are not limited or distinguished between each other for ease of description in this application document of the present invention. Unless otherwise specified, the security context is used as an example for description in this embodiment of this application. However, this embodiment of this application is also applicable to authentication information and/or authorization information described in another manner.

The AUSF network element is a control plane network element provided by the operator, and is usually used for primary authentication, namely, authentication between the terminal device (subscriber) and the operator network. After receiving an authentication request initiated by the subscriber, the AUSF network element may perform authentication and/or authorization on the subscriber by using authentication information and/or authorization information stored in the UDM network element, or generate authentication information and/or authorization information of the subscriber through the UDM network element. The AUSF network element may feed back the authentication information and/or the authorization information to the subscriber.

The NEF network element is a control plane network element provided by the operator. The NEF network element securely exposes an external interface of the operator network to the third party. When the SMF network element needs to communicate with a third-party network element, the NEF network element may serve as a relay for communication between the SMF network element and the third-party network element. When the NEF network element serves as the relay, the NEF network element may translate identification information of the subscriber and identification information of the third-party network element. For example, when the NEF sends the SUPI of the subscriber from the operator network to the third party, the NEF may translate the SUPI into an external identity (identity, ID) corresponding to the subscriber. When the NEF network element sends an external ID (an ID of the third-party network element) to the operator network, the NEF network element may translate the external ID into the SUPI.

The PCF network element is a control plane function provided by the operator, and is configured to provide a policy of the PDU session for the SMF network element. The policy may include a charging-related policy, a QoS-related policy, an authorization-related policy, and the like.

A network slice selection function (network slice selection function, NSSF) network element (not shown in the figure) is responsible for determining a network slice instance, selecting the AMF network element, and the like.

In FIG. 1A, Nnef, Nausf, Nnrf, Npcf, Nudm, Naf, Namf, Nsmf, N1, N2, N3, N4, and N6 are interface sequence numbers. For meanings of these interface sequence numbers, refer to meanings defined in the 3GPP standard protocol. This is not limited herein.

A mobility management network element in this application may be the AMF network element shown in FIG. 1A, or may be a network element that is in a future communications system and that has the function of the AMF network element. Alternatively, the mobility management network element in this application may be a mobility management entity (mobility management entity, MME) in long term evolution (long term evolution, LTE), or the like.

For ease of description, in this application, an example in which the mobility management network element is the AMF network element is used for subsequent description. Further, the AMF network element is briefly referred to as an AMF, and the terminal device is referred to as UE. In other words, in this application, the AMF described below may be replaced with the mobility management network element, and the UE may be replaced with the terminal device.

Currently, various scenarios have different requirements on a 3GPP ecosystem, such as requirements on charging, policy, security, and mobility. The 3GPP emphasizes that network slices do not affect each other. For example, a large quantity of burst meter reading services should not affect normal mobile broadband services. To meet diversified requirements and slice isolation, independent management and operation and maintenance are required for services, and customized service functions and analysis capabilities are provided. Instances of different service types are deployed on different network slices, and different instances of a same service type may also be deployed on different network slices. "The slice" in this application may also be referred to as "a network slice" or "a network slice instance", and "the slice", "the network slice", and "the network slice instance"

have a same meaning. Descriptions are uniformly provided herein. Details are not described subsequently again.

A slice in the 5G network is a virtual private network including a group of network functions or sub-networks. For example, the slice may include the RAN, the AMF, the SMF, and the UPF in FIG. 1A. In FIG. 1A, only one network function of each type is schematically illustrated. During actual network deployment, there may be a plurality of, dozens of, or hundreds of network functions or sub-networks of each type. Many network slices can be deployed on the operator network. Each slice may have different performance to meet requirements of different applications and vertical industries. The operator may "customize" a slice based on requirements of customers from different vertical industries. The operator may alternatively allow some industrial customers to enjoy relatively large autonomy and participate in some slice management and control functions. Slice-level authentication is a network control function in which the industry customers participate. That is, authentication and authorization are performed on a terminal user that requests to access the slice.

When the network slice is deployed on a core network, and a user initially attaches to (or referred to as registers with) the network, a network slice selection process is triggered. The slice selection process depends on subscription data of the user, local configuration information, a roaming agreement, an operator policy, and the like. In the network slice selection process, the foregoing parameters need to be comprehensively considered to select an optimal slice type for the UE.

When the UE needs to access a network slice, the UE may provide the requested network slice to the core network, so that the core network selects a network slice instance for the UE. The network slice requested by the UE may be represented by a requested network slice set, or may be represented by requested network slice selection assistance information (, requested NSSAI). The requested NSSAI includes one or more pieces of single network slice selection assistance information (S-NSSAI). Each piece of S-NSSAI is used to identify a network slice type, and may alternatively be understood as that the S-NSSAI is used to identify a network slice, or may be understood as that the S-NSSAI is identification information of a network slice. For simplicity, in the following descriptions, "the network slice" and "the S-NSSAI" are not strictly distinguished, and are both applicable to this application.

After the UE registers with the network, a core network element (for example, the AMF or the NSSF) performs comprehensive determining based on information such as subscription data of the UE, the requested NSSAI of the UE, the roaming protocol, and local configuration, and selects, for the UE, a set of network slices allowed to be accessed. The set of network slices allowed to be accessed may be represented by allowed NSSAI, and all pieces of S-NSSAI included in the allowed NSSAI are S-NSSAI allowed, by the current operator network, to be accessed.

Before accessing a network or a network slice, the UE needs to perform two-way authentication with the network slice and obtain authorization from the network. Currently, in a 5G standard, the operator network directly performs authentication and authorization on the UE, and this type of authentication and authorization method is referred to as primary authentication. With development of the vertical industries and the internet of things, authentication and authorization will be also required for UE that accesses a DN outside the operator network (for example, a DN serving the vertical industries). For example, a commercial company provides a game platform to provide a game service for a player through the operator network. On one hand, because UE used by the player accesses the game platform through the operator network, the operator network needs to perform authentication and authorization, namely, primary authentication, on the UE. The player is a customer of the commercial company, and the commercial company also needs to perform authentication and authorization on the player. If the authentication is based on the network slice, or a granularity (granularity) of the authentication is in a unit of a slice, the authentication may be referred to as slice authentication, secondary authentication, or slice-specific secondary authentication.

It should be noted that both primary authentication and secondary authentication are performed between the UE (or a user using the UE) and a network (the operator network or a third-party network). For example, primary authentication is authentication between the UE and the operator network. For example, in a registration procedure of the UE, the operator network performs primary authentication on the UE. If primary authentication succeeds, a security context of the UE may be established. For another example, secondary authentication is authentication between the UE (or a user using the UE) and a network (namely, a third-party network) outside the operator network, and the third-party network notifies the operator network of a result of secondary authentication, so that the operator network authorizes or rejects access of the UE to an operator network serving the third-party network.

It should be noted that, in subsequent descriptions of this application, secondary authentication may also be referred to as secondary authentication performed on a slice, slice authentication, or identity authentication performed on a user (a user using the UE). The meaning of secondary authentication is actually secondary authentication performed between the UE (or a user using the UE) and a third-party network. An authentication result of secondary authentication is used to determine whether the operator network authorizes access of the UE to the slice.

Figure 1B:
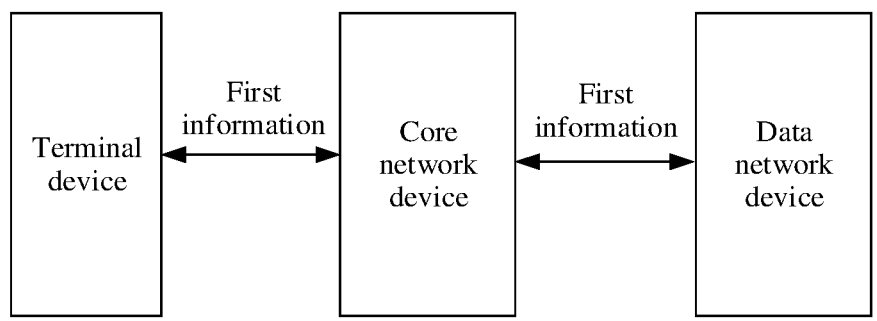
FIG. 1B is a schematic diagram of an authentication architecture according to an embodiment of this application.

FIG. 1B is a schematic diagram of an authentication architecture according to an embodiment of this application. Refer to FIG. 1B. The architecture includes a terminal device, a core network device, and a data network device. The terminal device requests, through the core network device, the data network device to perform secondary authentication (perform identity authentication on a user), where a message transmitted between the terminal device and the core network device and between the core network device and the data network device includes first information used to indicate user identity information, and the first information does not include privacy information in the user identity information. For example, the first information does not include a user name in the user identity information. In this way, leakage of the user identity information can be avoided, and authentication security is improved.

The core network device in this embodiment of this application may be an AMF, a proxy server, a proxy authentication function network element, or the like. The data network device may be an authentication, authorization, and accounting (AAA) server, or the like. The user identity information in this embodiment of this application is used to identify an identity of the user. The user in this application is different from user equipment (UE), and the user may be an individual using the user equipment (UE) (for example, a person, or another device that accesses a network through UE). The user identity information may be a data network user identity (data network user identity, DUI). The following uses an example in which the user identity information is the DUI for description.

Specific embodiments are used below to describe in detail the technical solutions of this application. It should be noted that the following several specific embodiments may be combined with each other, and same or similar content is not described repeatedly in different embodiments.

Figure 2:
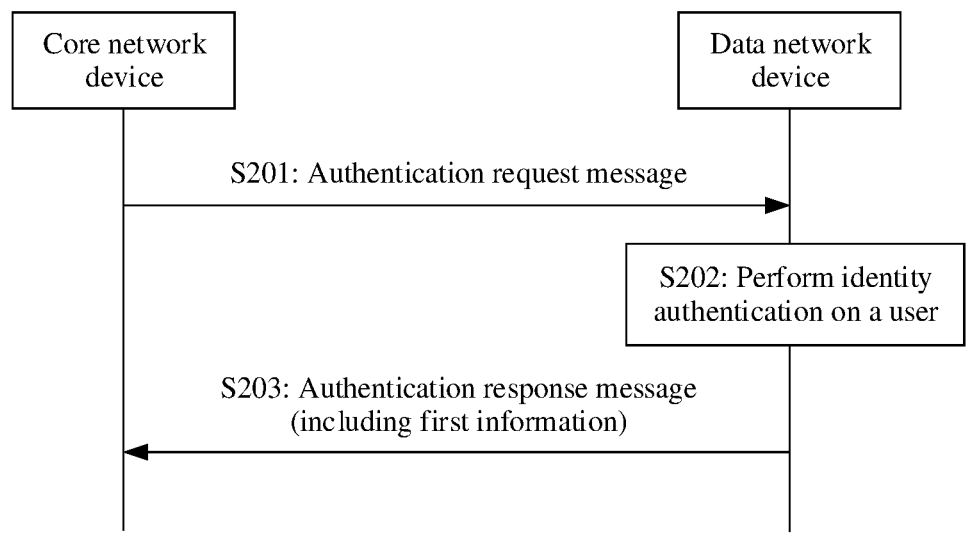
FIG. 2 is a schematic flowchart of an authentication method according to an embodiment of this application.

FIG. 2 is a schematic flowchart of an authentication method according to an embodiment of this application. Refer to FIG. 2. The method may include the following steps.

S201: A core network device sends an authentication request (slice authentication request) message of a user to a data network device, where the authentication request message is used to request the data network device to perform identity authentication on the user.

The authentication request message may include at least one of the following information: first information of the user or a DUI of the user.

The first information may indicate a DUI. In other words, there is a correspondence between first information and a DUI. The first information and the DUI may be in a one-to-one correspondence, or may be in a one-to-many, many-to-one, or many-to-many correspondence.

Optionally, the first information may be information obtained after privacy protection processing (for example, randomization processing, numbering processing, mapping processing, or encryption processing) is performed on user privacy information in the DUI. For ease of description, the first information obtained in this manner is referred to as a data network user conceived identity (DUC). For example, the user privacy information in the DUI may be a user name.

Optionally, when there is one user using a terminal device, the first information may alternatively be an identifier of the terminal device. The identifier of the terminal device may also be referred to as a terminal identifier (or a UE identifier). For example, the identifier of the terminal device may be a generic public subscription identifier (GPSI).

Optionally, the DUI includes routing information, and the routing information is used to indicate an address of the data network device. The core network device may forward information (for example, authentication request information, or other information sent to the data network device) to the data network device based on the routing information. The routing information may be private information, or may not be private information. If the routing information is the private information, privacy protection processing (for example, randomization processing, numbering processing, mapping processing, or encryption processing) may be performed on the routing information. In an actual application process, the first information corresponding to the DUI may be updated.

When the authentication request message includes the DUI, the DUI is located in a container of the authentication request message. For example, the container may be an extensible authentication protocol (EAP) message container used for EAP authentication. The core network device may only transparently transmit information in the container, but does not process the information in the container. That is, the information in the container is invisible to the core network device. In this way, because the core network device that transparently transmits the information does not interpret the DUI, leakage of the DUI to the core network device can be avoided, and leakage of the DUI in a process in which the core network device transmits the DUI can also be avoided.

When the authentication request message includes the first information, the first information may be located in the container of the authentication request message, or may be located outside the container. Because privacy protection processing has been performed on the first information, even if the first information is visible to another device (for example, a core network device, an air interface, or a core network eavesdropping device), privacy leakage of the DUI is not caused.

Optionally, the authentication request message may further include a UE identifier, for example, an SUPI or a GPSI, to indicate UE through which user authentication is performed on the user. On one hand, the UE may be used to identify the user. On the other hand, authorization may be performed based on a binding relationship between the UE and the user.

Optionally, before S201, the core network device may receive a registration request (registration request) message sent by the terminal device, and then perform the embodiment shown in FIG. 2 when determining, based on the registration request message, that identity authentication needs to be performed on the user.

S202: The data network device performs identity authentication on the user based on the authentication request message.

Optionally, when the authentication request message includes the DUI, the data network device may perform identity authentication on the user based on the DUI.

Optionally, when the authentication request message includes the first information, the data network device may determine, based on the correspondence between first information and a DUI, a DUI corresponding to the first information, and perform identity authentication on the user based on the determined DUI.

Optionally, when the authentication request message includes the DUI and the first information, the data network device may determine, based on the correspondence between first information and a DUI, a DUI corresponding to the first information, and determine whether the determined DUI is the same as the DUI in the authentication request message. If the determined DUI is the same as the DUI in the authentication request message, the data network device performs identity authentication on the user based on the DUI. In this way, a problem that user identity authentication is incorrect when the authentication request message is tampered with in a transmission process can be avoided.

Optionally, when the authentication request message includes the UE identifier, the data network device may further authenticate a correspondence between a UE identifier and a user. For example, if an authentication policy allows the user to use only specific UE for access, when the UE identifier included in the authentication request message does not correspond to the DUI, identity authentication performed on the user fails.

It should be noted that a process of performing identity authentication on the user based on the DUI varies with a specific authentication protocol that is used. Usually, an authentication process starts from the authentication request message, and may subsequently include steps such as authentication method negotiation, key algorithm negotiation, and two-way authentication authorization. Each step requires corresponding information exchange between the UE, the core network, and the data network device. For a specific process, refer to an existing process. Details are not described herein again.

S203: The data network device sends an authentication response message to the core network device.

Optionally, the authentication response message may be an authentication success response message or an authentication failure response message. When identity authentication performed by the data network device on the user succeeds, the data network device sends the authentication success response message to the core network device. When identity authentication performed by the data network device on the user fails, the data network device sends the authentication failure response message to the core network device.

Optionally, the authentication response message includes the first information.

Optionally, the authentication response message may further include the DUI. The DUI may be located in a container of the authentication response message, to avoid leakage of the DUI.

Optionally, when the first information is the DUC, after receiving the authentication response message, the core network device may determine a result (for example, authentication succeeds or authentication fails) of authentication performed by the data network device on a user indicated by the DUC. In this case, because neither the core network device nor an access network device can obtain the DUI, the DUI is not leaked to the core network device or the access network device, and the DUI is not leaked in a transmission process (for example, transmission between the terminal device and the access network device, transmission between the access network device and the core network device, or transmission between the core network device and the data network device).

Optionally, when the first information is the identifier of the terminal device, the core network device may obtain the DUI of the user based on the identifier of the terminal device, and determine a result (for example, authentication succeeds or authentication fails) of authentication performed on the user indicated by the DUI. In this case, because an access network device cannot obtain the DUI, the DUI is not leaked to the access network device, and the DUI is not leaked in a transmission process (for example, transmission between the terminal device and the access network device, transmission between the access network device and the core network device, or transmission between the core network device and the data network device).

Optionally, after receiving the authentication response message, the core network device may allow, based on the first information in the authentication response message, access to a corresponding slice of the user corresponding to the first information (or the UE used by the user), or may reject, based on the first information in the authentication response message, access to a corresponding slice of the user corresponding to the first information (or the UE used by the user). When the authentication response message is the authentication success response message, the core network device allows access to the corresponding slice of the user corresponding to the first information (or the UE used by the user). When the authentication response message is the authentication failure response message, the core network device rejects access to the corresponding slice of the user corresponding to the first information (or the UE used by the user).

According to the authentication method provided in this embodiment of this application, when identity authentication (secondary authentication) needs to be performed on the user, the core network device sends the authentication request message of the user to the data network device, and the data network device may perform identity authentication on the user, and send the authentication response message to the core network device. The authentication response message includes the first information, and the first information may indicate the DUI of the user. In this way, the core network device may determine, based on the authentication response message, the result of identity authentication performed on the user. In the foregoing process, the DUI of the user is invisible to other devices (the core network device and the access network device, or the access network device), so that the DUI is not leaked to these devices, and the DUI is not leaked in the transmission process (for example, transmission between the terminal device and the access network device, transmission between the access network device and the core network device, or transmission between the core network device and the data network device), thereby improving user privacy security.

Based on any one of the foregoing embodiments, the following describes the authentication method in detail with reference to FIG. 3 to FIG. 7.

Figure 3:
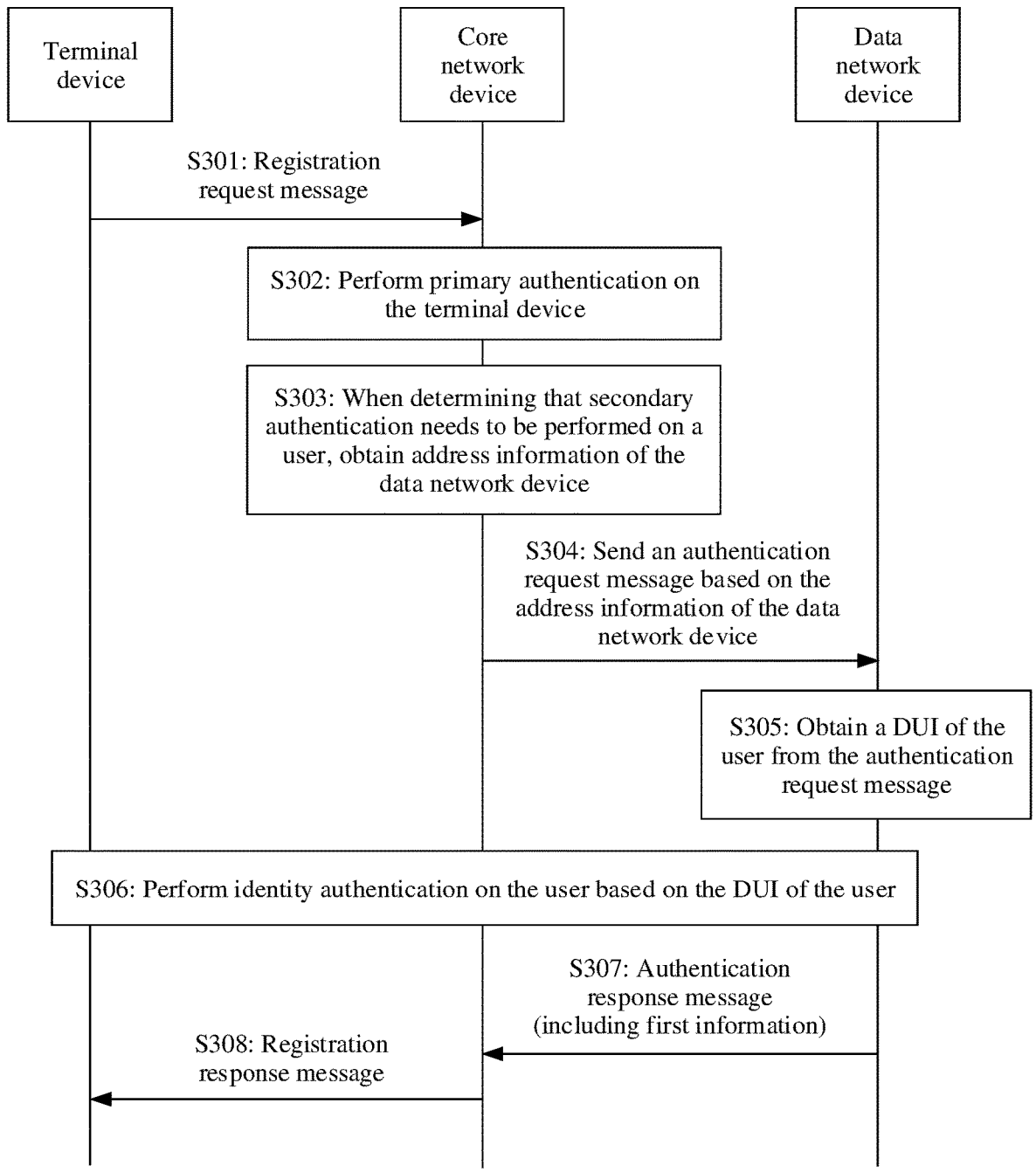
FIG. 3 is a schematic flowchart of another authentication method according to an embodiment of this application.

FIG. 3 is a schematic flowchart of another authentication method according to an embodiment of this application. Refer to FIG. 3. The method may include the following steps.

S301: A terminal device sends a registration request message to a core network device.

The registration request message includes first information and/or a DUI.

When the registration request message includes the DUI, the DUI is located in a container of the registration request message. When the registration request message includes the first information, the first information is located in or outside the container of the registration request message.

Optionally, the registration request message may further include an identifier of the terminal device and slice information. The identifier of the terminal device may include an SUPI and/or an SUCI. The slice information may be NSSAI. The identifier of the terminal device and the slice information are used to perform primary authentication on the terminal device.

Optionally, content (one or more of the first information, the DUI, the identifier of the terminal device, and the slice information) included in the registration request message may be processed information. For example, the content in the registration request message may be encrypted. For example, the registration request message is a part of a NAS (non-access stratum) message, and is encrypted by using a NAS key.

Optionally, the terminal device may store a correspondence between first information and a DUI. Correspondingly, the terminal device may determine corresponding first information based on the DUI, and include the first information in the registration request message.

S302: The core network device performs primary authentication on the terminal device.

It should be noted that S302 is an optional step. That is, S302 may be or may not be performed after S301.

Optionally, the core network device may perform primary authentication on the terminal device based on the identifier of the terminal device and the slice information, and may authorize the terminal device after primary authentication performed by the core network device on the terminal device succeeds.

S303: When determining that secondary authentication needs to be performed on a user, the core network device obtains address information of a data network device.

Optionally, the core network device may determine, in the following feasible implementation, whether secondary authentication needs to be performed on the user: The core network device obtains subscription data corresponding to the user (a user indicated by the first information and/or the DUI) and/or UE, and determines, based on the subscription data, whether the user purchases a corresponding service (a service provided by a slice that the user requests to access). If the user purchases the corresponding service, the core network device determines that secondary authentication needs to be performed on the user, or if the user does not purchase the corresponding service, the core network device determines that secondary authentication does not need to be performed on the user. When the registration request message includes the SUPI, UE subscription data corresponding to the SUPI may be obtained from a database based on the SUPI, and the subscription data may further include the subscription data corresponding to the user.

For example, if the core network device performs S302, S303 is performed after primary authentication performed by the core network device on the terminal device succeeds. If primary authentication performed by the core network device on the terminal device fails, the core network device may not perform S303 and S304.

It should be noted that, when determining that secondary authentication does not need to be performed on the user, the core network device does not perform S303 and S304.

Optionally, the core network device may obtain the address information of the data network device in the following feasible implementation: The core network device obtains at least one of the first information, the DUI, or the slice information. The core network device determines the address information of the data network device based on at least one of the first information, the DUI, or the slice information. The address information of the data network device may be a domain name, an internet protocol (IP) address, a media access control (MAC) address, or the like of the data network device.

It should be noted that, if the DUI is secure for the core network device, that is, if the DUI is not leaked when the core network device obtains the DUI, the core network device can obtain the DUI. For example, the core network device may have a function of obtaining the DUI in the container. In this way, the core network device can obtain the address information of the data network device based on the DUI. If the DUI is insecure for the core network device, that is, if the DUI may be leaked when the core network device obtains the DUI, the core network device cannot obtain the DUI. For example, the core network device may not have a function of obtaining the DUI in the container, that is, the core network device cannot obtain the DUI in the container, so that the DUI is invisible to the core network device.

The first information may include the address information of the data network device. Correspondingly, the core network device may obtain the address information of the data network device from the first information. Alternatively, a correspondence between first information and a data network device may be stored. Correspondingly, the address information of the data network device may be obtained based on the first information and the correspondence.

The DUI may include the address information of the data network device. Correspondingly, if the core network device can obtain the DUI, the core network device can obtain the address information of the data network device from the DUI.

There is a preset correspondence between slice information and a data network device. Correspondingly, the address information of the data network device may be obtained based on the slice information and the correspondence.

Optionally, when the address information is obtained separately based on the first information and/or the DUI and based on the slice information, an intersection of the address information obtained based on the first information and/or the DUI and the address information obtained based on the slice information may be obtained, and address information in the intersection is determined as the address information of the data network device.

Optionally, if the registration request message includes the first information and the identifier of the terminal device, the core network device may further store a correspondence between first information and an identifier of a terminal device. For example, the core network device may store a correspondence between first information and an SUPI, or store a correspondence between first information and a generic public subscription identifier (generic public subscription identifier, GPSI). In this way, the core network device may determine a corresponding terminal device based on the first information, or may determine first information based on the identifier of the terminal device. Certainly, if the core network device can obtain the DUI, the core network device can further store a correspondence between a DUI and an identifier of a terminal device.

S304: The core network device sends an authentication request message to the data network device based on the address information of the data network device.

The authentication request message may include at least one of the following information: the first information of the user or the DUI of the user.

Optionally, when the registration request message sent by the terminal device to the core network device includes the container, the core network device encapsulates the container in the registration request message in the authentication request message when sending the authentication request message.

It should be noted that, for a process of performing S304, refer to a process of performing S201. Details are not described herein again.

S305: The data network device obtains the DUI of the user from the authentication request message.

The data network device stores the correspondence between a DUI and first information.

If the container of the authentication request message includes the DUI, the data network device obtains the DUI from the container of the authentication request message.

If the authentication request message includes the first information, the data network device may obtain, based on the correspondence between first information and a DUI, a DUI corresponding to the first information.

If the authentication request message includes the first information and the DUI, the data network device may obtain, based on the correspondence between first information and a DUI, a DUI corresponding to the first information, and obtain the DUI from the container of the authentication request message, and determine whether the DUI corresponding to the first information is the same as the DUI obtained from the authentication request message. If the DUI corresponding to the first information is the same as the DUI obtained from the authentication request message, the DUI corresponding to the first information or the DUI in the authentication request message is determined as the DUI of the user.

S306: The data network device performs identity authentication on the user based on the DUI of the user.

For example, the data network device may determine the corresponding user based on the DUI of the user, and perform identity authentication on the determined user.

It should be noted that, for a process of performing S306, refer to a process of performing S202. Details are not described herein again.

S307: The data network device sends an authentication response message to the core network device.

The authentication response message includes the first information.

Optionally, the authentication response message may further include the DUI. The DUI may be located in a container of the authentication response message, to avoid leakage of the DUI.

When identity authentication performed by the data network device on the user succeeds, the data network device sends an authentication success response message to the core network device. When identity authentication performed by the data network device on the user fails, the data network device sends an authentication failure response message to the core network device.

S308: The core network device sends a registration response message to the terminal device.

Optionally, when the first information is a DUC, after receiving the authentication response message, the core network device may determine a result (for example, authentication succeeds or authentication fails) of authentication performed by the data network device on a user indicated by the DUC. In this case, because neither the core network device nor an access network device can obtain the DUI, the DUI is not leaked to the core network device or the access network device, and the DUI is not leaked in a transmission process (for example, transmission between the terminal device and the access network device, transmission between the access network device and the core network device, or transmission between the core network device and the data network device).

Optionally, when the first information is the identifier of the terminal device, the core network device may obtain the DUI of the user based on the identifier of the terminal device, and determine a result (for example, authentication succeeds or authentication fails) of authentication performed on the user indicated by the DUI. In this case, because an access network device cannot obtain the DUI, the DUI is not leaked to the access network device, and the DUI is not leaked in a transmission process (for example, transmission between the terminal device and the access network device, transmission between the access network device and the core network device, or transmission between the core network device and the data network device).

Optionally, when the authentication response message is the authentication success response message, the registration response message is a registration success response message. When the authentication response message is the authentication failure response message, the registration response message is a registration failure response message.

Optionally, if the registration request message includes the first information, after receiving the registration request message, the core network device may store the first information. Correspondingly, after receiving the authentication response message, the data network device may determine whether the stored first information is the same as the first information included in the authentication response message. If the stored first information is the same as the first information included in the authentication response message, the core network device then sends the registration success response message to the terminal device.

In the embodiment shown in FIG. 3, in a network registration process, when identity authentication (secondary authentication) needs to be performed on the user, the core network device sends the authentication request message of the user to the data network device, and the data network device may perform identity authentication on the user, and send the authentication response message to the core network device. The authentication response message includes the first information, and the first information may indicate the DUI of the user. In this way, the core network device may determine, based on the authentication response message, the result of identity authentication performed on the user. In the foregoing process, the DUI of the user is invisible to other devices (the core network device and the access network device, or the access network device), so that the DUI is not leaked to these devices, and the DUI is not leaked in the transmission process (for example, transmission between the terminal device and the access network device, transmission between the access network device and the core network device, or transmission between the core network device and the data network device), thereby improving user privacy security.

Figure 4:
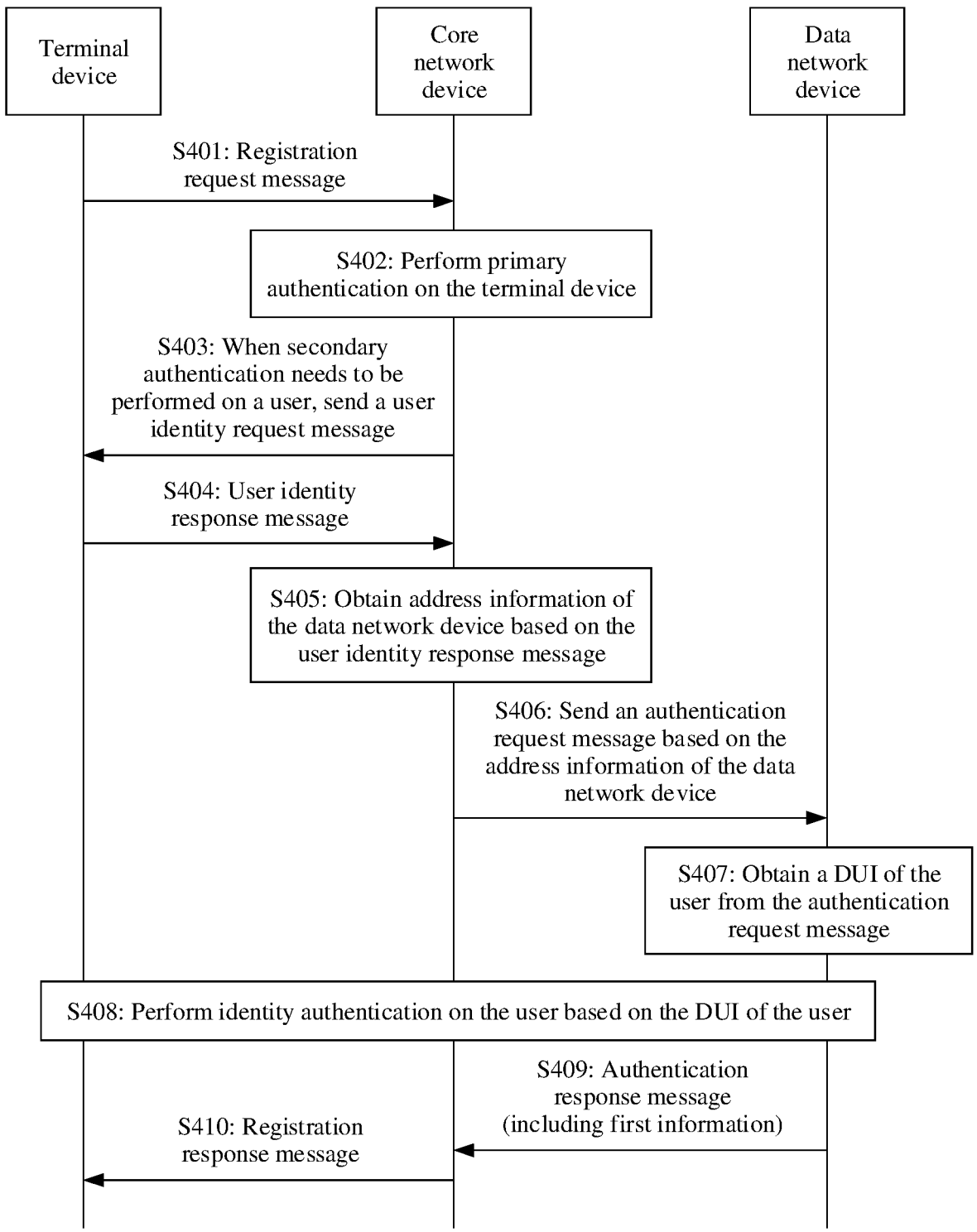
FIG. 4 is a schematic flowchart of still another authentication method according to an embodiment of this application.

FIG. 4 is a schematic flowchart of still another authentication method according to an embodiment of this application. Refer to FIG. 4. The method may include the following steps.

S401: A terminal device sends a registration request message to a core network device.

The registration request message includes an identifier of the terminal device and slice information.

Optionally, the identifier of the terminal device may include an SUPI and/or an SUCI. The slice information may be NSSAI. The identifier of the terminal device and the slice information are used to perform primary authentication on the terminal device.

S402: The core network device performs primary authentication on the terminal device.

It should be noted that, for a process of performing S402, refer to a process of performing S302. Details are not described herein again.

S403: When determining that secondary authentication needs to be performed on a user, the core network device sends a user identity request (ID request) message to the terminal device.

The user identity request message is used to request identity information of the user.

S404: The terminal device sends a user identity response (ID response) message to the core network device.

The user identity response message includes first information and/or a DUI. When the user identity response message includes the DUI, the DUI is located in a container of the user identity response message. When the user identity response message includes the first information, the first information is located in or outside a container of the user identity response message.

Optionally, the first information and/or the DUI included in the user identity response message may be processed information. For example, the first information and/or the DUI may be encrypted. For example, the first information and/or the DUI may be encrypted by using a non-access stratum (non-access stratum, NAS) key.

Optionally, the terminal device stores a correspondence between first information and a DUI.

S405: The core network device obtains address information of a data network device based on the user identity response message.

It should be noted that, for a process in which the core network device obtains the address information of the data network device, refer to a process of obtaining the address information of the data network device in S303. Details are not described herein again.

S406: The core network device sends an authentication request message to the data network device based on the address information of the data network device.

The authentication request message may include at least one of the following information: the first information of the user or the DUI of the user. Optionally, the authentication request message may further include a UE identifier, for example, a GPSI.

S407: The data network device obtains the DUI of the user from the authentication request message.

S408: The data network device performs identity authentication on the user based on the DUI of the user.

S409: The data network device sends an authentication response message to the core network device.

The authentication response message includes the first information.

Optionally, the authentication response message may further include the DUI.

S410: The core network device sends a registration response message to the terminal device.

It should be noted that, for a process of performing S406 to S410, refer to a process of performing S304 to S308. Details are not described herein again.

In the embodiment shown in FIG. 4, in a network registration process, when identity authentication (secondary authentication) needs to be performed on the user, the core network device sends the authentication request message of the user to the data network device, and the data network device may perform identity authentication on the user, and send the authentication response message to the core network device. The authentication response message includes the first information, and the first information may indicate the DUI of the user. In this way, the core network device may determine, based on the authentication response message, the result of identity authentication performed on the user. In the foregoing process, the DUI of the user is invisible to other devices (the core network device and an access network device, or an access network device), so that the DUI is not leaked to these devices, and the DUI is not leaked in a transmission process (for example, transmission between the terminal device and the access network device, transmission between the access network device and the core network device, or transmission between the core network device and the data network device), thereby improving user privacy security.

Figure 5:
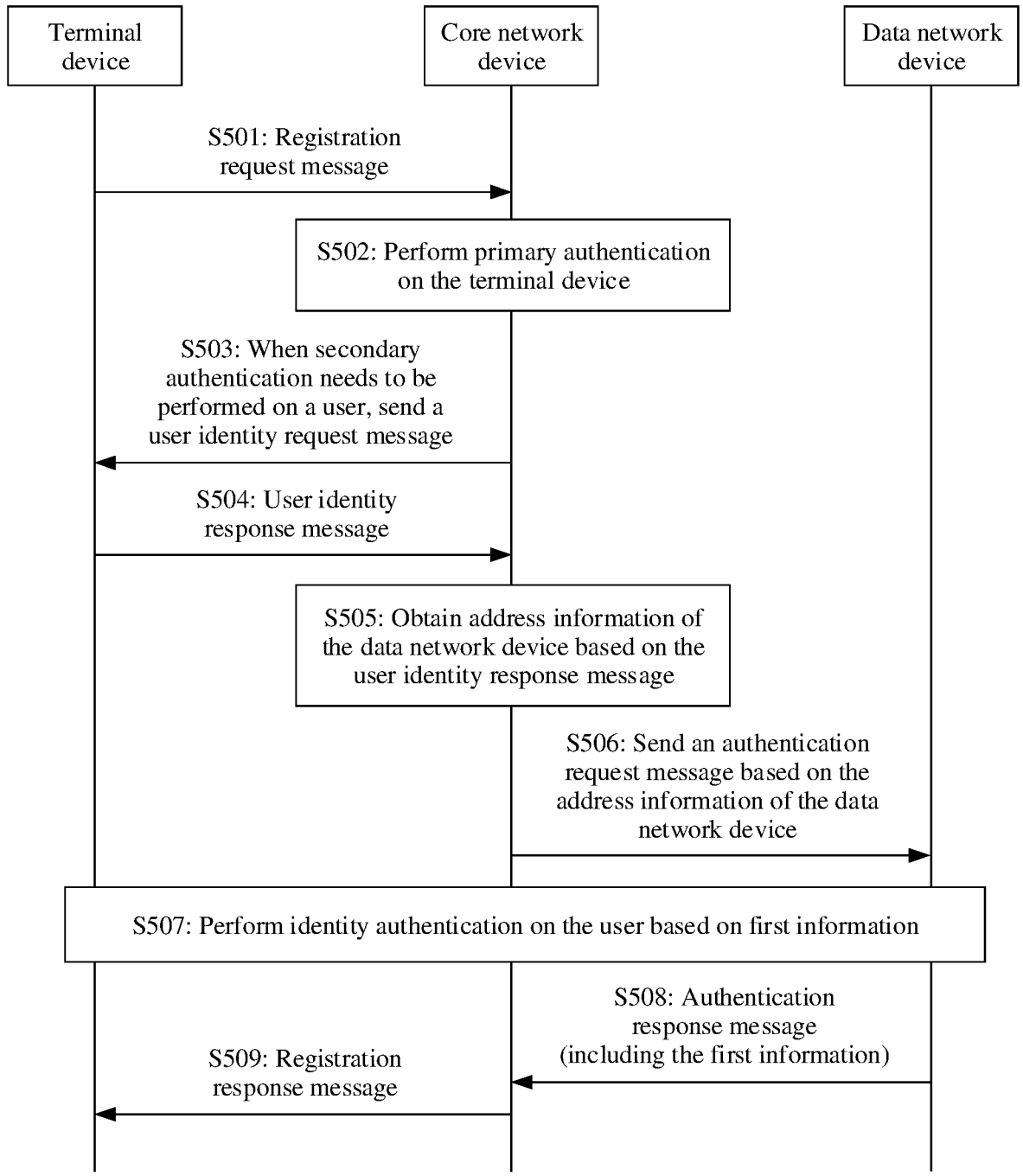
FIG. 5 is a schematic flowchart of yet another authentication method according to an embodiment of this application.

FIG. 5 is a schematic flowchart of yet another authentication method according to an embodiment of this application. Refer to FIG. 5. The method may include the following steps.

S501: A terminal device sends a registration request message to a core network device.

The registration request message includes an identifier of the terminal device and slice information.

S502: The core network device performs primary authentication on the terminal device.

S503: When determining that secondary authentication needs to be performed on a user, the core network device sends a user identity request (ID request) message to the terminal device.

It should be noted that, for a process of performing S501 to S503, refer to a process of performing S401 to S403. Details are not described herein again.

S504: The terminal device sends a user identity response (ID response) message to the core network device.

The user identity response message includes first information.

Optionally, the user identity response message does not include a container. Alternatively, the user identity response message includes a container, and the first information is located in or outside the container.

Optionally, the terminal device determines a DUI of the user based on a user identity request message, and performs preset processing (for example, randomization processing or mapping processing) on the DUI, to obtain first information, and includes the first information in the user identity response message.

S505: The core network device obtains address information of a data network device based on the user identity response message.

It should be noted that, for a process in which the core network device obtains the address information of the data network device, refer to a process of obtaining the address information of the data network device in S303. Details are not described herein again.

It should be noted that, in the embodiment shown in FIG. 5, the address information of the data network device may alternatively be obtained in the manner shown in S301 to S303. That is, a process of S501 to S505 may alternatively be replaced with a process of S301 to S303.

S506: The core network device sends an authentication request message to the data network device based on the address information of the data network device.

The authentication request message includes the first information.

Optionally, the authentication request message does not include a container. Alternatively, the authentication request message includes a container, and the first information is located in or outside the container.

Optionally, the core network device may obtain the first information from the user identity response message, and include the first information in the authentication request message.

S507: The data network device performs identity authentication on the user based on the first information.

Optionally, the data network device may store first information corresponding to each DUI. Correspondingly, the data network device may determine a corresponding user based on the first information, and perform identity authentication on the corresponding user.

For example, it is assumed that the first information is obtained by performing randomization processing on the DUI. Correspondingly, the data network device stores the first information obtained after randomization processing is performed on each DUI, or the data network device may perform an inverse operation of randomization processing. Each DUI may be inversely obtained for the first information.

Optionally, when the authentication request message includes a UE identifier, the data network device may further authenticate a correspondence between a UE identifier and a user. For example, if an authentication policy allows the user to use only specific UE for access, when the UE identifier included in the authentication request message does not correspond to the DUI, identity authentication performed on the user fails.

S508: The data network device sends an authentication response message to the core network device.

The authentication response message includes the first information.

S509: The core network device sends a registration response message to the terminal device.

It should be noted that, for a process of performing S508 and S509, refer to a process of performing S307 and S308. Details are not described herein again.

In the embodiment shown in FIG. 5, in a network registration process, when identity authentication (secondary authentication) needs to be performed on the user, the core network device sends the authentication request message of the user to the data network device, and when identity authentication performed by the data network device on the user is completed, the data network device sends the authentication response message to the core network device. The authentication response message includes the first information, and the first information may indicate the DUI of the user. In this way, the core network device may determine, based on the authentication response message, the result of identity authentication performed on the user. In the foregoing process, the DUI of the user is invisible to other devices (the core network device and an access network device, or an access network device), so that the DUI is not leaked to these devices, and the DUI is not leaked in a transmission process (for example, transmission between the terminal device and the access network device, transmission between the access network device and the core network device, or transmission between the core network device and the data network device), thereby improving user privacy security. Further, a correspondence between a DUI and first information does not need to be stored in the data network device and the terminal device, thereby reducing occupation of storage space.

Figure 6:
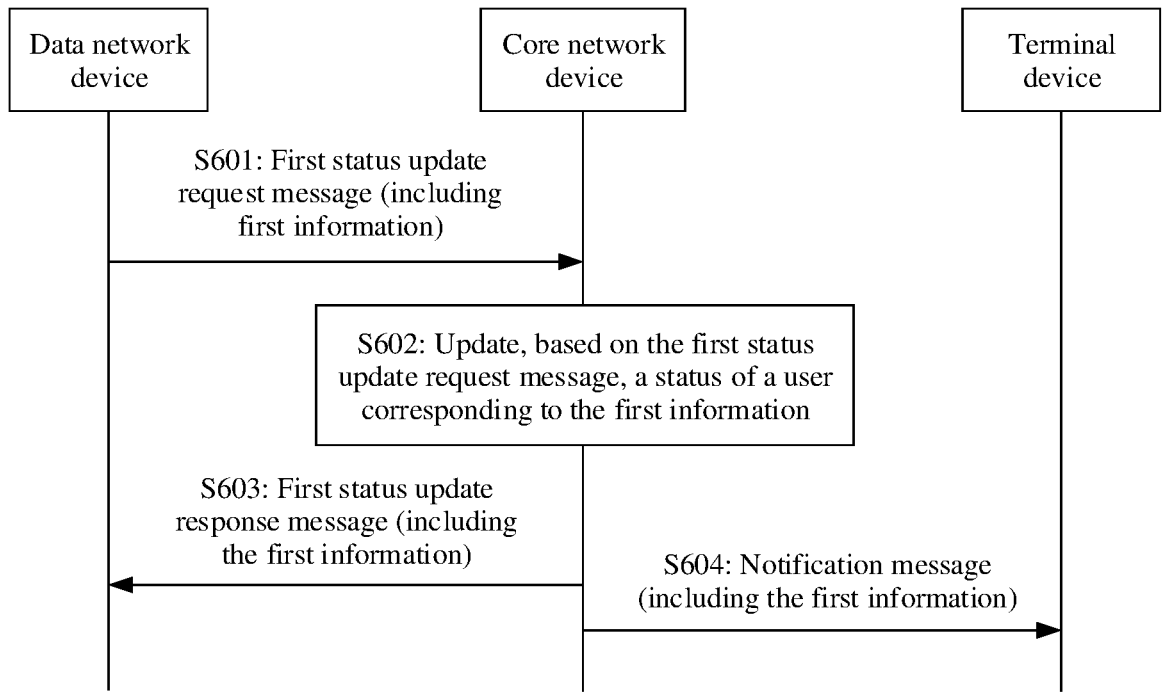
FIG. 6 is a schematic flowchart of another authentication method according to an embodiment of this application.

FIG. 6 is a schematic flowchart of another authentication method according to an embodiment of this application. Refer to FIG. 6. The method may include the following steps.

S601: A data network device sends a first status update request message to a core network device.

The first status update request message includes first information. The first status update request message is used to request to update a status of a user indicated by the first information.

Optionally, the first status update request message may be used to request to perform an update operation (a modification operation, a revocation operation, or the like) on permission of the user. When the first status update request message is used to request to perform the update operation on the permission of the user, the data network device may perform the update operation on the permission of the user in the data network device, and then request the core network device to perform the update operation on the permission of the user.

Optionally, when determining to update the status of the user, the data network device obtains a DUI of the user, then obtains, based on a correspondence between a DUI and first information, first information corresponding to the DUI, and sends the first status update request message including the first information to the core network device.

Optionally, the first status update request message may further include an identifier of a terminal device. For example, the identifier of the terminal device may be a GPSI.

S602: The core network device updates, based on the first status update request message, the status of the user corresponding to the first information.

Optionally, the core network device may identify the corresponding user based on the first information in the first status update request message, and update the status of the user.

It should be noted that, in the embodiments shown in FIG. 2 to FIG. 5, the core network device stores an authentication result of the user corresponding to the first information, and the authentication result may include the status of the user. Correspondingly, the core network device may identify the corresponding user based on the first information in the first status update request message, and update the status of the corresponding user.

S603: The core network device sends a first status update response message to the data network device.

The first status update response message includes the first information.

The data network device may determine, based on the first status update response message, a latest status of the user indicated by the first information.

S604: The core network device sends a notification message to the terminal device.

The notification message includes the first information. The notification message is used to indicate that the status of the user corresponding to the first information is updated.

Optionally, the core network device may obtain the identifier of the terminal device from the first status update request message, and send the notification message to the terminal device based on the identifier of the terminal device.

The terminal device stores the correspondence between a DUI and first information. One terminal device may correspond to one or more users. Therefore, after receiving the notification message, the terminal device may determine a corresponding user based on the first information in the notification message and the correspondence.

In the embodiment shown in FIG. 6, after updating the status of the user, the data network device sends the first status update request message to the core network device, and includes the first information in the first status update request message. In this way, the core network device can identify the corresponding user based on the first information, and update the status of the identified user. In the foregoing process, in a process in which the data network device communicates with the core network device, the DUI of the user is invisible to the core network device, thereby avoiding leakage of the DUI, and ensuring user privacy.

Figure 7:
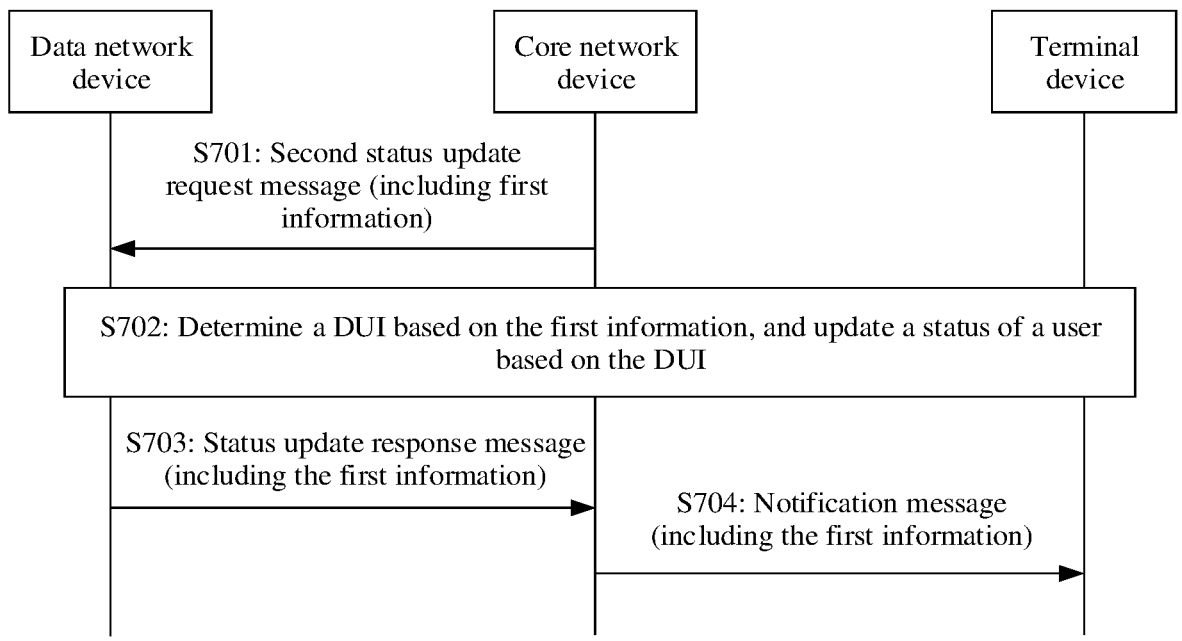
FIG. 7 is a schematic flowchart of still another authentication method according to an embodiment of this application.

FIG. 7 is a schematic flowchart of still another authentication method according to an embodiment of this application. Refer to FIG. 7. The method may include the following steps.

S701: A core network device sends a second status update request message to a data network device, where the second status update request message includes first information.

Optionally, the core network device may detect a status of a user, and may send the second status update request message to the data network device when detecting that the status of the user is abnormal.

For example, the second status update request message may be used to request the data network device to re-perform identity authentication on the user, and perform an update operation (a modification operation, a revocation operation, or the like) or the like on permission of the user.

S702: The data network device determines a DUI based on the first information, and updates the status of the user based on the DUI.

The data network device stores a correspondence between a DUI and first information, and may determine the DUI based on the first information and the correspondence.

For example, when the second status update request message is used to request the data network device to re-perform identity authentication on the user, the data network device re-perform identity authentication on the user. For a process of performing identity authentication on the user, refer to the embodiments shown in FIG. 2 to FIG. 5. Details are not described herein again. When the second status update request message is used to request to update the permission of the user, the data network device verifies the permission of the user, and agrees or rejects the update operation performed on the permission of the user.

S703: The data network device sends a second status update response message to the core network device.

The second status update response message includes the first information.

The core network device may determine, based on the second status update response message, a latest status of the user indicated by the first information.

S704: The core network device sends a notification message to a terminal device.

The notification message includes the first information. The notification message is used to indicate that the status of the user corresponding to the first information is updated.

Optionally, the core network device may obtain an identifier of the terminal device from a first status update request message, and send the notification message to the terminal device based on the identifier of the terminal device.

The terminal device stores the correspondence between a DUI and first information. One terminal device may correspond to one or more users. Therefore, after receiving the notification message, the terminal device may determine a corresponding user based on the first information in the notification message and the correspondence.

In the embodiment shown in FIG. 7, the core network device may request the data network device to perform the update operation on the status of the user, and information exchanged between the data network device and the core network device includes the first information. In this way, the core network device can identify the corresponding user based on the first information, so that the data network device implements the update operation on the status of the user. In the foregoing process, in a process in which the data network device communicates with the core network device, the DUI of the user is invisible to another device in transmission between the core network device, the terminal device and the data network device, thereby avoiding leakage of the DUI, and ensuring user privacy.

Figure 8:
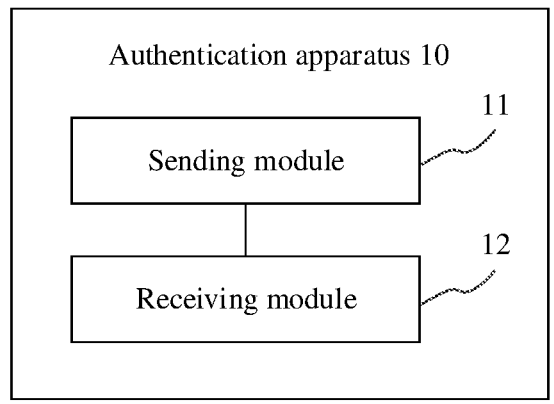
FIG. 8 is a schematic structural diagram of an authentication apparatus according to an embodiment of this application.

FIG. 8 is a schematic structural diagram of an authentication apparatus according to an embodiment of this application. The authentication apparatus 10 may be applied to a core network device 10. Refer to FIG. 8. The authentication apparatus 10 may include a sending module 11 and a receiving module 12.

The sending module 11 is configured to send an authentication request message of a user to a data network device, where the authentication request message is used to request the data network device to perform identity authentication on the user.

The receiving module 12 is configured to receive an authentication response message sent by the data network device, where the authentication response message includes first information, and the first information is used to indicate user identity information of the user.

Optionally, the sending module 11 may perform steps related to a sending function of the core network device in the foregoing method embodiments. For example, the sending module 11 may perform S201 in the embodiment in FIG. 2, S304 and S308 in the embodiment in FIG. 3, S403, S406, and S410 in the embodiment in FIG. 4, S503, S506, and S509 in the embodiment in FIG. 5, S604 in the embodiment in FIG. 6, and S701 and S704 in the embodiment in FIG. 7.

Optionally, the receiving module 12 may perform steps related to a sending function of the core network device in the foregoing method embodiments. For example, the sending module 11 may perform S203 in the embodiment in FIG. 2, S301 and S307 in the embodiment in FIG. 3, S401, S404, and S409 in the embodiment in FIG. 4, S501, S504, and S508 in the embodiment in FIG. 5, S601 and S603 in the embodiment in FIG. 6, and S703 in the embodiment in FIG. 7.

The authentication apparatus 10 in this embodiment of this application can perform the technical solutions shown in the foregoing method embodiments. Implementation principles and beneficial effects of the authentication apparatus 10 are similar to those in the method embodiments. Details are not described herein again.

In a possible implementation, the authentication request message includes the first information.

In a possible implementation, the authentication request message further includes the user identity information, the user identity information is located in a container of the authentication request message, and the first information is located outside the container of the authentication request message.

In a possible implementation, the receiving module 12 is further configured to: before the sending module 11 sends the authentication request message to the data network device, receive a registration request message sent by a terminal device, where the registration request message includes the first information and the user identity information, the user identity information is located in a container of the registration request message, and the first information is located outside the container of the registration request message.

In a possible implementation, the sending module 11 is further configured to: before the sending module 11 sends the authentication request message to the data network device, send a user identity request message to a terminal device.

The receiving module 12 is further configured to receive a user identity response message sent by the terminal device, where the user identity response message includes the first information and the user identity information.

Figure 9:
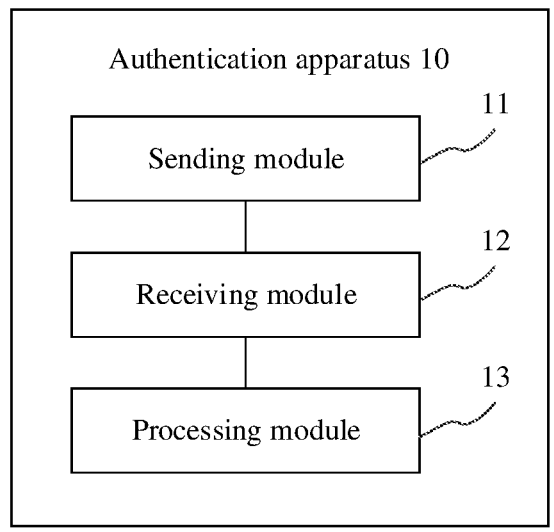
FIG. 9 is a schematic structural diagram of another authentication apparatus according to an embodiment of this application.

FIG. 9 is a schematic structural diagram of another authentication apparatus according to an embodiment of this application. Refer to FIG. 9. Based on the embodiment shown in FIG. 8, the authentication apparatus 10 may further include a processing module 13. The processing module 13 is configured to: obtain an identifier of the terminal device, and store a correspondence between the identifier of the terminal device and the first information.

In a possible implementation, the identifier of the terminal device includes a subscription permanent identifier (SUPI) and/or a subscription concealed identifier (SUCI).

In a possible implementation, the processing module 13 is further configured to: obtain the first information, and determine address information of the data network device based on the first information.

The sending module 11 is specifically configured to send the authentication request message to the data network device based on the address information.

In a possible implementation, slice information is network slice selection assistance information (NSSAI).

In a possible implementation, the receiving module 12 is further configured to receive a first status update request message sent by the data network device, where the first status update request message includes the first information.

The processing module 13 is further configured to update, based on the first status update request message, a status of the user corresponding to the first information.

The sending module 11 is further configured to send a first status update response message to the data network device, where the first status update response message includes the first information.

In a possible implementation, the sending module 11 is further configured to send a second status update request message to the data network device, where the second status update request message includes the first information.

The receiving module 12 is further configured to receive a second status update response message sent by the data network device, where the second status update response message includes the first information.

In a possible implementation, the sending module 11 is further configured to send a notification message to the terminal device, where the notification message includes the first information, and is used to indicate that the status of the user corresponding to the first information is updated.

The authentication apparatus 10 in this embodiment of this application can perform the technical solutions shown in the foregoing method embodiments. Implementation principles and beneficial effects of the authentication apparatus 10 are similar to those in the method embodiments. Details are not described herein again.

Figure 10:
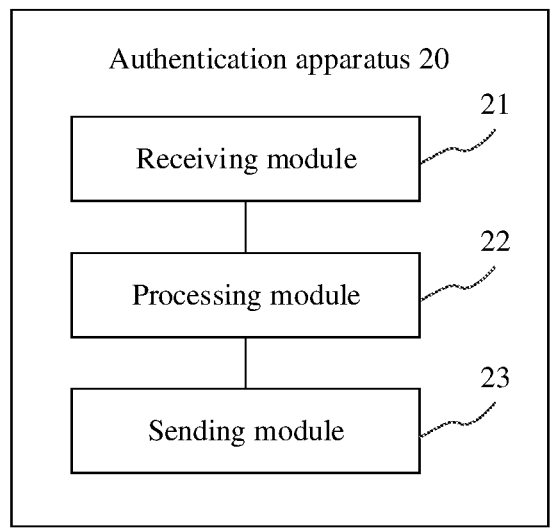
FIG. 10 is a schematic structural diagram of still another authentication apparatus according to an embodiment of this application.

FIG. 10 is a schematic structural diagram of still another authentication apparatus according to an embodiment of this application. The authentication apparatus 20 may be applied to a data network device. Refer to FIG. 10. The authentication apparatus 20 may include a receiving module 21, a processing module 22, and a sending module 23.

The receiving module 21 is configured to receive an authentication request message of a user sent by a core network device.

The processing module 22 is configured to perform identity authentication on the user based on the authentication request message.

The sending module 23 is configured to send an authentication response message to the core network device, where the authentication response message includes first information, and the first information is used to indicate user identity information of the user.

Optionally, the receiving module 21 may perform steps related to a sending function of the core network device in the foregoing method embodiments. For example, the sending module 11 may perform S201 in the embodiment in FIG. 2, S304 in the embodiment in FIG. 3, S406 in the embodiment in FIG. 4, S506 in the embodiment in FIG. 5, S604 in the embodiment in FIG. 6, and S704 in the embodiment in FIG. 7.

Optionally, the processing module 22 may perform steps related to a sending function of the core network device in the foregoing method embodiments. For example, the sending module 11 may perform S202 in the embodiment in FIG. 2, S305 and S306 in the embodiment in FIG. 3, S407 and S408 in the embodiment in FIG. 4, S507 in the embodiment in FIG. 5, S602 in the embodiment in FIG. 6, and S702 in the embodiment in FIG. 7.

Optionally, the sending module 23 may perform steps related to a sending function of the core network device in the foregoing method embodiments. For example, the sending module 11 may perform S203 in the embodiment in FIG. 2, S307 in the embodiment in FIG. 3, S409 in the embodiment in FIG. 4, S508 in the embodiment in FIG. 5, S601 and S603 in the embodiment in FIG. 6, and S703 in the embodiment in FIG. 7.

The authentication apparatus 20 in this embodiment of this application can perform the technical solutions shown in the foregoing method embodiments. Implementation principles and beneficial effects of the authentication apparatus 20 are similar to those in the method embodiments. Details are not described herein again.

In a possible implementation, the authentication request message includes the first information.

In a possible implementation, the authentication request message further includes the user identity information, the user identity information is located in a container of the authentication request message, and the first information is located outside the container of the authentication request message.

In a possible implementation, the authentication request message includes the first information. The processing module 22 is specifically configured to: determine the user identity information based on the first information, and perform identity authentication on the user based on the user identity information.

In a possible implementation, the authentication request message includes the first information. The processing module 22 is specifically configured to: perform identity authentication on the user based on the first information.

In a possible implementation, the authentication request message includes the user identity information. The processing module 22 is further configured to: before the sending module 23 sends the authentication response message to the core network device, determine the first information based on the user identity information.

In a possible implementation, the sending module 23 is further configured to send a first status update request message to the core network device, where the first status update request message includes the first information, and the first status update request message is used to request the core network device to update a status of the user indicated by the first information.

The receiving module 21 is further configured to receive a first status update response message sent by the core network device, where the first status update response message includes the first information.

In a possible implementation, the receiving module 21 is further configured to receive a second status update request message sent by the core network device, where the second status update request message includes the first information.

The processing module 22 is further configured to: determine the user identity information based on the first information, and update the status of the user based on the user identity information.

The sending module 23 is further configured to send a second status update response message to the core network device, where the second status update response message includes the first information.

The authentication apparatus 10 in this embodiment of this application can perform the technical solutions shown in the foregoing method embodiments. Implementation principles and beneficial effects of the authentication apparatus 10 are similar to those in the method embodiments. Details are not described herein again.

Figure 11:
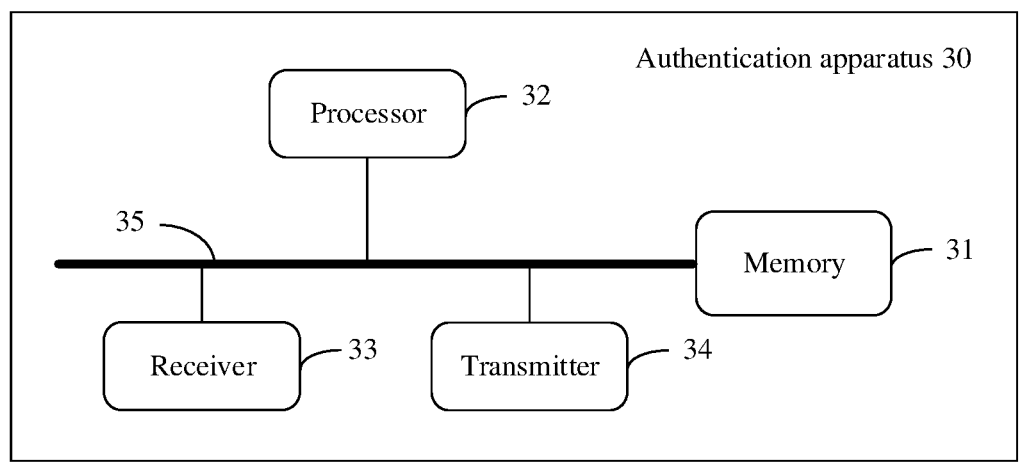
FIG. 11 is a schematic diagram of a hardware structure of an authentication apparatus according to an embodiment of this application.

FIG. 11 is a schematic diagram of a hardware structure of an authentication apparatus according to an embodiment of this application. Refer to FIG. 11. The authentication apparatus 30 includes a memory 31, a processor 32, a receiver 33, and a transmitter 34, where the memory 31 communicates with the processor 32. For example, the memory 31, the processor 32, the receiver 33, and the transmitter 34 may communicate with each other by using a communications bus 35. The memory 31 is configured to store a computer program, and the processor 32 executes the computer program to implement the foregoing authentication method.

Optionally, the processor 32 shown in this application may implement a function of the processing module 13 in the embodiment in FIG. 9, the receiver 33 may implement a function of the receiving module 12 in the embodiments in FIG. 8 and FIG. 9, and the transmitter 34 may implement a function of the sending module 11 in the embodiments in FIG. 8 and FIG. 9. Details are not described herein again.

Optionally, the processor 32 may be a central processing unit (central processing unit, CPU), or may be another general-purpose processor, a digital signal processor (digital signal processor, DSP), an application-specific integrated circuit (application-specific integrated circuit, ASIC), or the like. The general-purpose processor may be a microprocessor, or the processor may be any conventional processor or the like. Steps in the embodiments of the authentication method disclosed with reference to this application may be directly performed by a hardware processor, or may be performed by using a combination of hardware in the processor and a software module.

Figure 12:
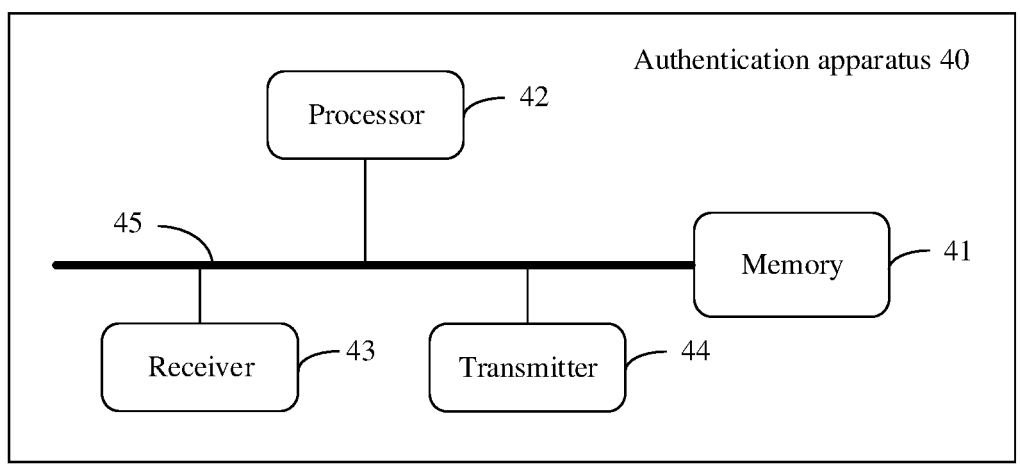
FIG. 12 is a schematic diagram of a hardware structure of another authentication apparatus according to an embodiment of this application.

FIG. 12 is a schematic diagram of a hardware structure of another authentication apparatus according to an embodiment of this application. Refer to FIG. 12. The authentication apparatus 40 includes a memory 41, a processor 42, a receiver 43, and a transmitter 44, where the memory 41 communicates with the processor 42. For example, the memory 41, the processor 42, the receiver 43, and the transmitter 44 may communicate with each other by using a communications bus 45. The memory 41 is configured to store a computer program, and the processor 42 executes the computer program to implement the foregoing authentication method.

Optionally, the processor 42 shown in this application may implement a function of the processing module 22 in the embodiment in FIG. 10, the receiver 43 may implement a function of the receiving module 21 in the embodiment in FIG. 10, and the transmitter 44 may implement a function of the sending module 23 in the embodiment in FIG. 10. Details are not described herein again.

Optionally, the processor may be a CPU, or may be another general-purpose processor, a DSP, an ASIC, or the like. The general-purpose processor may be a microprocessor, or the processor may be any conventional processor or the like. Steps in the embodiments of the authentication method disclosed with reference to this application may be directly performed by a hardware processor, or may be performed by using a combination of hardware in the processor and a software module.

This application provides a storage medium. The storage medium is configured to store a computer program, and the computer program is used to implement the authentication method in the foregoing embodiments.

All or some of the steps of the method embodiments may be implemented by hardware related to program instructions. The foregoing program may be stored in a readable memory. When the program is executed, the steps in the foregoing method embodiments are performed. The foregoing memory (storage medium) includes: a read-only memory (English: read-only memory, ROM for short), a RAM, a flash memory, a hard disk, a solid-state drive, a magnetic tape (English: magnetic tape), a floppy disk (English: floppy disk), an optical disc (English: optical disc), and any combination thereof.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processing unit of another programmable data processing device to generate a machine, so that instructions executed by the computer or the processing unit of the another programmable data processing device generate an apparatus for implementing a specified function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

The computer program instructions may alternatively be loaded onto a computer or another programmable data processing device, so that a series of operations and steps are performed on the computer or another programmable device, thereby generating computer-implemented processing. Therefore, the instructions executed on the computer or the another programmable device provide steps for implementing a specified function in one or more processes in the flowcharts and/or in one or more blocks in the block diagrams.

It is clear that a person skilled in the art can make various modifications and variations to the embodiments of this application without departing from the spirit and scope of this application. This application is intended to cover these modifications and variations provided that they fall within the scope of protection defined by the following claims and their equivalent technologies.

In this application, the term "including" and a variant thereof may refer to non-limitative inclusion, and the term "or" and a variant thereof may refer to "and/or". In this application, the terms "first", "second", and the like are intended to distinguish between similar objects but do not necessarily indicate a specific order or sequence. In this application, "a plurality of" means two or more than two. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

What is claimed is:

1. An authentication method, comprising:
sending, by a core network device disposed between a terminal device of a user and a data network device, an authentication request message of the user to the data network device, wherein the authentication request message requests that the data network device perform identity authentication on the user, the authentication request message comprises first information indicating user identity information of the user, and the authentication request message further comprises the user identity information, wherein the user identity information is located in a container of the authentication request message, and wherein the first information is located outside the container of the authentication request message; and
receiving, by the core network device, an authentication response message from the data network device, wherein the authentication response message comprises the first information.

2. The method according to claim 1, further comprising performing, before the sending the authentication request message:
receiving, by the core network device, a registration request message from the terminal device, wherein the registration request message comprises the first information and the user identity information, wherein the user identity information is disposed in a container of the registration request message, and wherein the first information is disposed outside the container of the registration request message.

3. The method according to claim 1, further comprising performing, before the sending the authentication request message:
sending, by the core network device, a user identity request message to the terminal device; and
receiving, by the core network device, a user identity response message from the terminal device, wherein the user identity response message comprises the first information and the user identity information.

4. The method according to claim 1, further comprising:
obtaining, by the core network device, an identifier of the terminal device; and
storing, by the core network device, a correspondence between the identifier of the terminal device and the first information.

5. The method according to claim 1, wherein the sending the authentication request message comprises:
obtaining, by the core network device, the first information;
determining, by the core network device, address information of the data network device based on the first information; and
sending, by the core network device, the authentication request message to the data network device based on the address information.

6. An authentication apparatus, comprising:
at least one processor; and
a non-transitory computer readable memory coupled to the at least one processor and having a program stored thereon for execution by the at least one processor, the program including instructions to:
send an authentication request message of a user to a data network device, wherein the authentication apparatus is disposed between a terminal device of the user and the data network device, wherein the authentication request message requests that the data network device perform identity authentication on the user, the authentication request message comprises first information indicating user identity information of the user, and the authentication request message further comprises the user identity information, wherein the user identity information is located in a container of the authentication request message, and wherein the first information is located outside the container of the authentication request message; and
receive an authentication response message from the data network device, wherein the authentication response message comprises the first information.

7. The apparatus according to claim 6, wherein the program further includes instructions to:
receive, before sending the authentication request message to the data network device, a registration request message from the terminal device, wherein the registration request message comprises the first information and the user identity information, wherein the user identity information is disposed in a container of the registration request message, and wherein the first information is disposed outside the container of the registration request message.

8. The apparatus according to claim 6, wherein the program further includes instructions to:
send, before sending the authentication request message to the data network device, a user identity request message to the terminal device; and
receive a user identity response message from the terminal device, wherein the user identity response message comprises the first information and the user identity information.

9. The apparatus according to claim 6, wherein the program further includes instructions to:
obtain an identifier of the terminal device; and
store a correspondence between the identifier of the terminal device and the first information.

10. The apparatus according to claim 6, wherein the program further includes instructions to:
obtain the first information, and determine address information of the data network device based on the first information; and
send the authentication request message to the data network device based on the address information.

11. A non-transitory computer-readable storage medium having instructions stored thereon which, when executed by an apparatus, cause the apparatus to:
send an authentication request message of a user to a data network device, wherein the apparatus is disposed between a terminal device of the user and the data network device, wherein the authentication request message requests that the data network device perform identity authentication on the user, the authentication request message comprises first information indicating user identity information of the user, and the authentication request message further comprises the user identity information, wherein the user identity information is located in a container of the authentication request message, and wherein the first information is located outside the container of the authentication request message; and
receive an authentication response message from the data network device, wherein the authentication response message comprises the first information.

12. The non-transitory computer-readable storage medium according to claim 11, wherein the instructions, when executed by the apparatus, further cause the apparatus to:

receive, before sending the authentication request message to the data network device, a registration request message sent by the terminal device, wherein the registration request message comprises the first information and the user identity information, wherein the user identity information is disposed in a container of the registration request message, and wherein the first information is disposed outside the container of the registration request message.

13. The non-transitory computer-readable storage medium according to claim 11, wherein the instructions, when executed by the apparatus, further cause the apparatus to:

send, before sending the authentication request message to the data network device, a user identity request message to the terminal device; and receive a user identity response message sent by the terminal device, wherein the user identity response message comprises the first information and the user identity information.

14. The non-transitory computer-readable storage medium according to claim 11, wherein the instructions, when executed by the apparatus, further cause the apparatus to:

obtain the first information, and determine address information of the data network device based on the first information; and send the authentication request message to the data network device based on the address information.

* * * * *